United States Patent [19]

Teraoka et al.

[11] 4,268,048
[45] May 19, 1981

[54] FUEL TANK MOUNTING STRUCTURE FOR A TRACTOR

[75] Inventors: Akira Teraoka, Takaishi; Mitsugu Nakada, Sakai, both of Japan

[73] Assignee: Kubota, Ltd., Osaka, Japan

[21] Appl. No.: 78,408

[22] Filed: Sep. 24, 1979

[30] Foreign Application Priority Data

Dec. 18, 1978 [JP] Japan .................. 53/175630

[51] Int. Cl.³ .................. B60N 1/00; B60R 11/00
[52] U.S. Cl. .................. 280/5 A; 224/42.13; 180/89.1; 180/900
[58] Field of Search ............ 280/5 A, 5 R; 180/900, 180/89.1; 224/42.42 R, 42.13, 42.43, 42.45 R, 32 A, 279

[56] References Cited

U.S. PATENT DOCUMENTS

| | | | |
|---|---|---|---|
| 1,624,493 | 4/1927 | Malm | 224/42.13 |
| 1,966,022 | 7/1934 | Sumner | 280/5 A |
| 2,580,481 | 1/1952 | Strehlow | 180/900 |
| 3,633,609 | 1/1972 | Benner | 280/5 A |
| 3,671,070 | 6/1972 | Johnson et al. | 280/5 A |
| 3,797,604 | 3/1974 | Davis | 180/89.1 |
| 3,926,276 | 12/1975 | Sien | 180/89.1 |

FOREIGN PATENT DOCUMENTS 23852  8/1930  Australia .................. 280/5 A

Primary Examiner—John J. Love
Assistant Examiner—Donn McGiehan
Attorney, Agent, or Firm—Kane, Dalsimer, Kane; Sullivan and Kurucz

[57] ABSTRACT

A tractor is provided in which left and right fenders for the rear wheels are disposed at the left and right hands with respect to the transmission case. A fuel tank is disposed between these left and right fenders. A luggage carrier is disposed so as to cover the top surface of this tank and connected to the left and right fenders so as to stride thereover.

3 Claims, 3 Drawing Figures

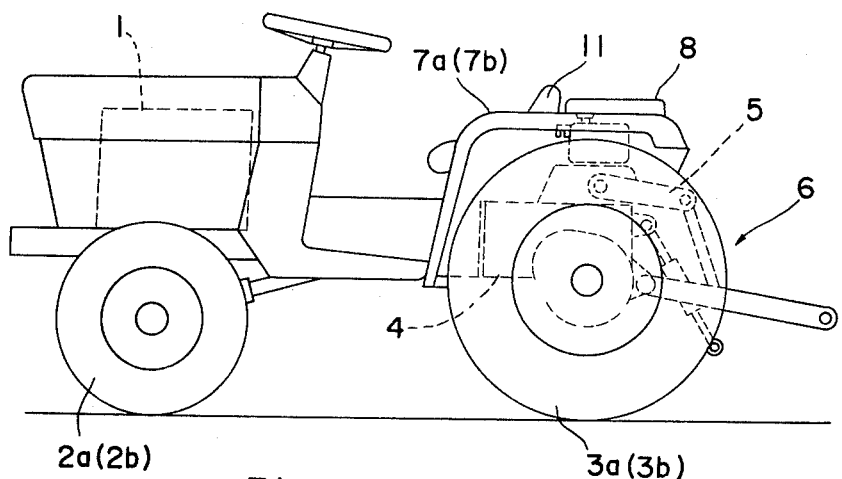
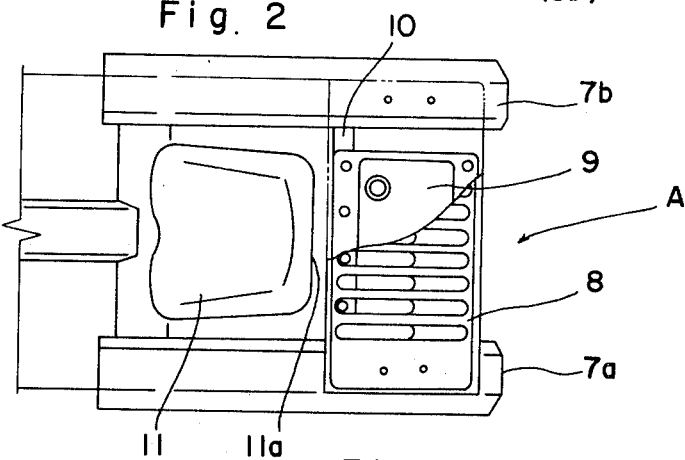
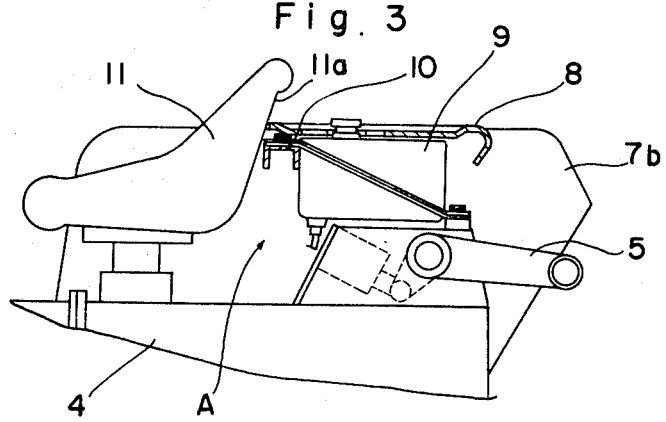

FUEL TANK MOUNTING STRUCTURE FOR A TRACTOR

BACKGROUND OF THE INVENTION

The present invention relates to a tractor in which left and right fenders for the rear wheels are disposed at the left and right hand sides with respect to the transmission case.

In a conventional tractor, a fuel tank has generally been disposed at the back of the engine. Due to such arrangement, the space for a driver seat has been reduced so that the driver encounters a difficulty in getting on and off, or steering the tractor. On the other hand, the space at the back of the seat has been left as unutilized.

SUMMARY OF THE INVENTION

It is an object of the present invention to provide a tractor in which the defects above-mentioned are improved.

A tractor according to the present invention comprises a transmission case, left and right fenders for rear wheels disposed at the left and right hands with respect to the transmission case, a seat disposed on the transmission case so as to define a space together with the top surface of the transmission case, the lateral sides of the left and right fenders and the rear side of the seat, a fuel tank disposed within the space and attached to the transmission case, and a luggage carrier disposed so as to cover the top surface of the fuel tank and connected to the fenders so as to stride thereover.

Separated from the back side of the engine, the fuel tank is disposed at the back of the seat, thus enabling to assure a larger seat space, thereby to permit the driver to easily steer and get on/off the tractor.

In addition, as mentioned earlier, provision of the luggage carrier in a simple construction permits the fuel tank to be protected and packages such as lunch boxes to be placed thereon.

Furthermore, since the left and right fenders are connected to each other at this luggage carrier, vibration of the fenders may be reduced.

It is another object of the present invention to provide a tractor in which vibration of the fenders may securely be reduced.

In order to achieve this object, there is provided a stay for connecting the fenders to the fuel tank, whereby the whole structure is formed in a unitary construction to reduce vibration of the fenders.

Other objects and advantages of the present invention will be apparent from the following detailed description.

BRIEF DESCRIPTION OF THE DRAWINGS

FIG. 1 is a general side view of a tractor according to the present invention;
FIG. 2 is a plan view of main portions in FIG. 1; and
FIG. 3 is a side view of main portions in FIG. 1.

DETAILED DESCRIPTION OF THE PREFERRED EMBODIMENT

As shown in FIG. 1, an engine 1 is disposed at the front side of the vehicle body. Disposed at the rear side of the vehicle body is a case 4 for a transmission to transmit engine power to a pair of front wheels 2a and 2b and a pair of rear wheels 3a and 3b. Attached to the transmission case 4 is a link mechanism 6 constructed in a vertically movable manner by a lift-arm 5. A luggage carrier 8 is disposed on left and right fenders 7a and 7b for the rear wheels which are disposed at the left and right hands with respect to the transmission case 4. Thus, the tractor according to the present invention permits a working machine to be attached thereto in a driving manner in the vertical direction through the link mechanism 6, and also a working machine to be attached thereto in a tractive manner.

As shown in FIGS. 1 to 3, a seat 11 is disposed on the transmission case 4 so as to define a space A for housing a fuel tank 9 to be discussed later, together with the top surface of the transmission case 4 and the lateral sides of the left and right fenders 7a and 7b and the rear side 11a of the seat 11.

As shown in FIGS. 2 and 3, one end of the fuel tank 9 for the engine 1 is connected to a stay 10 which connects the left and right fenders for the rear wheels, to each other. The other end of the fuel tank 9 is attached to the transmission case 4. Thus, the stay 10 simultaneously forms a tank mounting member. In order to prevent vibration of the fenders 7a and 7b, these fenders 7a and 7b are connected to the transmission case 4 through the stay 10 and the tank 9.

The luggage carrier 8 is attached to the left and right fenders 7a and 7b so as to cover the top surface of the fuel tank 9. Thus, the luggage carrier 8 may simultaneously form a protection member of the fuel tank 9 and also a member for securely connecting the left and right fenders 7a and 7b to each other in a unitary construction.

We claim:
1. In a fuel tank mounting structure for a tractor, comprising:
   a transmission case;
   left and right fenders for rear wheels disposed at lateral sides of said transmission case;
   a seat disposed on said transmission case, a space being defined above said transmission case and rearwardly of said seat and between said left and right fenders; and
   a fuel tank disposed within said space and attached to said transmission case;
   the improvement comprising:
   a plate-like table disposed upwardly of said fuel tank and secured at left and right end portions thereof to upper portions of said left and right fenders.
2. A fuel tank mounting structure as set forth in claim 1, further comprising a stay attaching said fuel tank to said left and right fenders.
3. A fuel tank mounting structure as set forth in claim 2, wherein said table is formed of a single plate.

* * * * *